United States Patent
Horn et al.

(10) Patent No.: US 6,613,869 B1
(45) Date of Patent: Sep. 2, 2003

(54) CONTAINERS MADE OF A BRANCHED POLYCARBONATE

(75) Inventors: Klaus Horn, Dormagen (DE); Ralf Hufen, Duisburg (DE); Wolfgang Alewelt, Krefeld (DE); Peter Gebauer, Lohmar (DE); Franky Bruynseels, Sint-Gillis-Waas (BE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/070,792
(22) PCT Filed: Aug. 31, 2000
(86) PCT No.: PCT/EP00/08471
§ 371 (c)(1), (2), (4) Date: Apr. 12, 2002
(87) PCT Pub. No.: WO01/19892
PCT Pub. Date: Mar. 22, 2001

(30) Foreign Application Priority Data

Sep. 13, 1999 (DE) .......................... 199 43 642

(51) Int. Cl.$^7$ .............................................. C08G 64/00
(52) U.S. Cl. ................... 528/198; 264/176.1; 264/219; 264/330; 264/331.18; 264/340; 428/36.92; 525/63; 525/64; 525/65; 525/67; 528/196; 528/204
(58) Field of Search ................. 428/36.92; 528/196, 528/198, 204; 525/63, 64, 65, 67; 264/176.1, 219, 330, 331.18, 340

(56) References Cited

U.S. PATENT DOCUMENTS

| | | | | |
|---|---|---|---|---|
| 5,367,044 A | * | 11/1994 | Rosenquist | |
| 6,423,766 B1 | * | 7/2002 | Itagaki | ........................ 524/127 |
| 6,441,071 B1 | * | 8/2002 | Van Nuffel | ................. 524/111 |

FOREIGN PATENT DOCUMENTS

| | | | |
|---|---|---|---|
| EP | 0411433 | * | 6/1911 |
| EP | 0411433 | | 2/1991 |
| EP | 0699685 | | 3/1996 |

OTHER PUBLICATIONS

A.S. Kaminski and A. Kappenstein, Polycarbonates in Becker, Braun, Kunststoff handbuch, vol. 3/1 Polycarbonates, Polyester, Celluloseester, Carl Hanser Verlag, Munich, Vienna, (month unavailable) 1992, pp. 213–216.

Polycarbonate in Becker, Braun, Kunststoff–Handbuch, vol. 3/1 Polycarbonate Polyacetale, Polyester Celluloseester, Carl Hanser Verlag, Munich Vienna, (month unavailable) 1992, pp. 248–255.

* cited by examiner

*Primary Examiner*—Terressa M. Boykin
(74) *Attorney, Agent, or Firm*—Joseph C. Gil; James R. Franks; Aron Preis

(57) ABSTRACT

A branched polycarbonate resin suitable for making containers is disclosed. The polycarbonate is characterized in that at 260° C. and shear rate of 10 s$^{-1}$ it has a melt viscosity of 5500 to 900 Pas, and in that at 260° C. and shear rate of 1000 s$^{-1}$ it has a melt viscosity of 880 tom 1500 Pas, and in that it has a melt flow index (MFR) of 0.1 to 3.0 g/10 min. A container made of the polycarbonate exhibits great breaking strength.

15 Claims, 1 Drawing Sheet

CONTAINERS MADE OF A BRANCHED POLYCARBONATE

The present invention relates to containers of branched polycarbonate, to the production thereof and to the use thereof and to branched polycarbonate.

Containers of polycarbonate are known.

Containers of polycarbonate exhibit numerous advantageous properties, such as for example elevated transparency, good mechanical properties, elevated resistance to environmental influences and a long service life together with low weight and straightforward, low-cost producibility.

Polycarbonate containers are produced, for example, using the extrusion blow moulding process or the injection blow moulding process.

In the extrusion blow moulding process, the pellets are generally melted with a single screw extruder and are shaped by a die to form a free-standing tube, which is subsequently enclosed by a blowing mould, which pinches together the bottom of the tube. The tube is inflated within the mould, thus being shaped as desired. After a cooling period, the mould is opened and the hollow article may be removed (a more detailed description may be found, for example, in Brinkschröder, F. J., Polycarbonate in Becker, Braun, Kunststoff-Handbuch, volume 3/1, *Polycarbonate, Polyacetale, Polyester, Celluloseester*, Carl Hanser Verlag, Munich, Vienna 1992, pages 257 to 264).

It is advantageous to use a highly pseudoplastic polycarbonate for extrusion blow moulding in order to ensure elevated melt stability. Branched polycarbonates are particularly pseudoplastic.

The injection blow moulding process is a combination of injection moulding and blow moulding.

The process proceeds in three stages:
1) injection moulding of the parison in the plastic temperature range of the polycarbonate
2) inflation of the parison in the thermoplastic range of the polycarbonate (the core of the injection moulding tool is simultaneously the blowing mandrel)
3) stripping of the hollow article and, optionally, cooling of the blowing mandrel with air (a more detailed description may be found, for example, in Anders, S., Kaminski, A., Kappenstein, R., *Polycarbonate* in Becker, Braun, Kunststoff-Handbuch, volume 3/1, *Polycarbonate, Polyacetale, Polyester, Celluloseester*, Carl Hanser Verlag, Munich, Vienna 1992, pages 223 to 225).

Known containers of polycarbonate exhibit the disadvantage that they do not meet certain requirements for practical use. If known containers of polycarbonate are subjected to severe mechanical stress, the container may burst. This may occur, for example, if a liquid-filled container is dropped from some height onto the ground, for example from the loading area of a truck in which the container is being transported. Such mechanical loads may, for example, be simulated by the drop test as is described in the present text.

The object of the invention is accordingly to provide containers of polycarbonate which have greater breaking strength than known containers of polycarbonate when subjected to severe mechanical stress.

The object according to the invention is achieved by containers of branched polycarbonate, characterised in that, at 260° C. and a shear rate of 10 s$^{-1}$, the polycarbonate has a melt viscosity of 5500 to 9000 Pas, preferably of 6000 to 8000 Pas and particularly preferably of 6500 to 8000 Pas and, at 260° C. and a shear rate of 1000 s$^{-1}$, a melt viscosity of 880 to 1500 Pas, preferably of 900 to 1500 Pas and particularly preferably of 950 to 1200 Pas and that it has an MFR (melt flow index, measured to ISO1133) of 0.1 to 3.0 g/10 min, preferably of 0.5 to 2.8 g/10 min and particularly preferably of 0.5 to 2.5 g/10 min.

The containers of branched polycarbonate are preferably characterised in that phenol and/or alkylphenols and/or arylphenols are used in the production of the branched polycarbonate, with alkylphenols and/or arylphenols being particularly preferred and alkylphenols being very particularly preferred.

The containers of branched polycarbonate are furthermore preferably characterised in that phenol is used in the production of the branched polycarbonate and that the branched polycarbonate contains 1,1,1-tris(4-hydroxyphenyl)ethane (THPE) and/or 3,3-bis(3-methyl-4-hydroxyphenyl)-2-oxo-2,3-dihydroindole (IBK, isatin biscresol) as branching agent.

The containers of branched polycarbonate are furthermore preferably characterised in that the polycarbonate has a branching index at 260° C., defined as the quotient of melt viscosity at a shear rate of 10$^{-1}$ and 1000 s$^{-1}$, of 6 to 12, preferably of 7 to 12 and particularly preferably of 7 to 10. The branching index is abbreviated to SV index.

The containers of branched polycarbonate are furthermore preferably characterised in that alkylphenols and/or arylphenols are preferably used in the production of the branched polycarbonate, with alkylphenols being particularly preferred and that the branched polycarbonate contains 1,1,1-tris(4-hydroxyphenyl)ethane (THPE) and/or 3,3-bis(3-methyl-4-hydroxyphenyl)-2-oxo-2,3-dihydroindole (IBK, isatin biscresol) as branching agent.

The containers of branched polycarbonate are particularly preferably characterised in that p-tert.-cumylphenol is used as the arylphenol in the production of the branched polycarbonate.

The containers of branched polycarbonate are furthermore particularly preferably characterised in that p-tert.-butylphenol or isooctylphenol is used as the alkylphenol in the production of the branched polycarbonate.

These containers are accordingly provided by the present invention.

The present invention also provides the production of the containers according to the invention.

The present invention also provides the use of the containers according to the invention.

The present invention also provides the branched polycarbonates of which the containers consist and which have the above-stated features.

Figure 1:
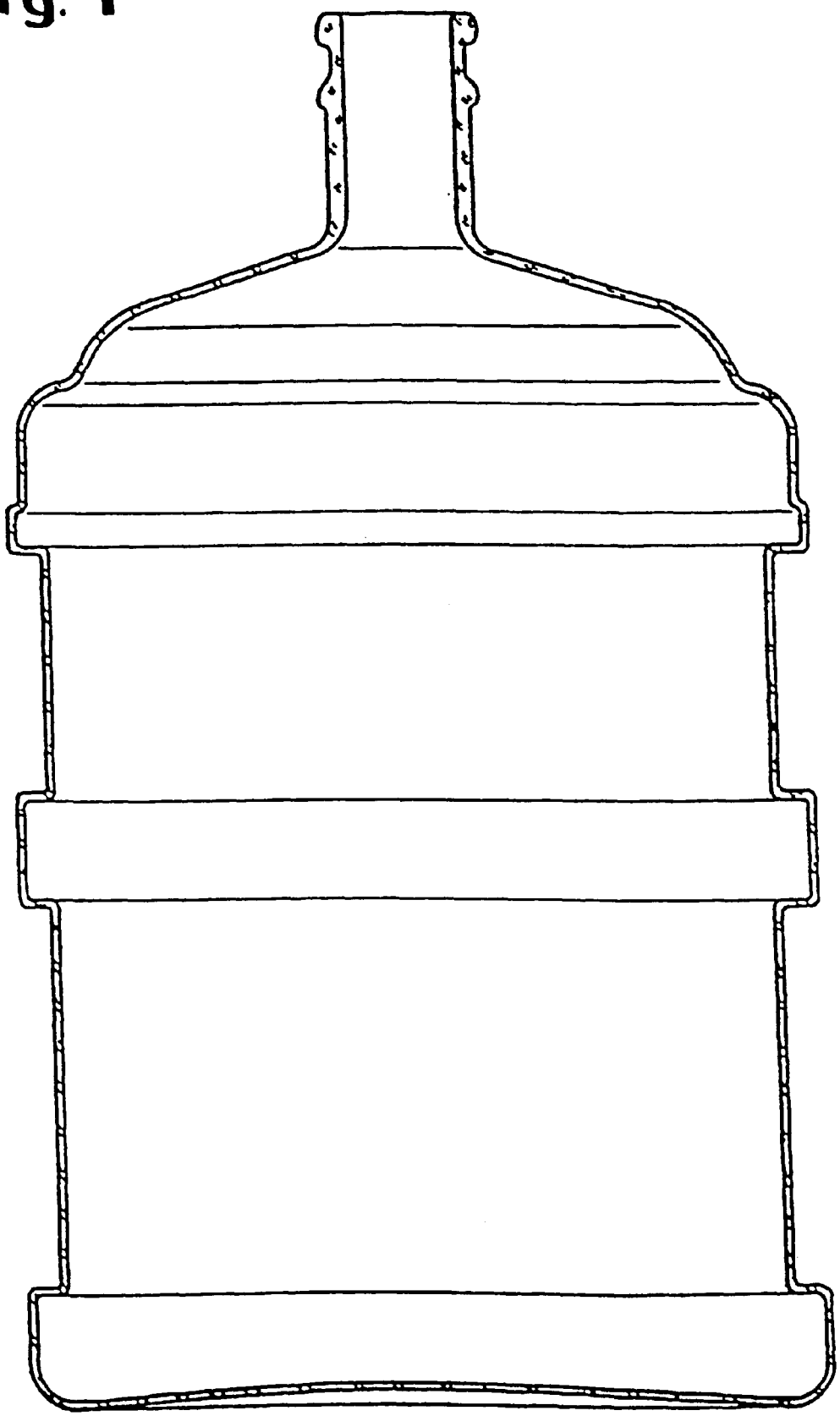
FIG. 1 is a cross section through a rotationally symmetrical container—water bottle.

The containers according to the invention exhibit numerous advantages. They are resistant to mechanical stress, i.e. to breakage, and furthermore exhibit an advantageous range of further mechanical properties. They have good optical properties, in particular exhibiting elevated transparency. They have an elevated heat distortion temperature. Thanks to the elevated heat distortion temperature, the containers according to the invention may be cleaned with hot water or be sterilised with steam. They have elevated resistance to conventional cleaning agents, which are for example used for cleaning water bottles for multi-trip use, one area of application of the containers according to the invention. They may be produced easily and at low cost using known processes, the good processing characteristics of the polycarbonate being of particular advantage in this connection. They exhibit slight ageing of the material in service and thus a long service life. In the case of conventional multi-trip use, this means many usage cycles.

Branched polycarbonates suitable according to the invention are both branched homopolycarbonates and branched copolycarbonates. A mixture of branched polycarbonates suitable according to the invention may also be used.

It is possible to add a small proportion of unbranched polycarbonates to the branched polycarbonates, providing that the essential properties, in particular the elevated breaking strength, of the containers produced from the polycarbonates are not impaired.

Preferred branched polycarbonates are those branched homopolycarbonates and branched copolycarbonates based on bisphenols of the general formula (I),

HO—Z—OH  (I)

in which

Z is a divalent organic residue having 6 to 30 C atoms, which contains one or more aromatic groups.

Examples of bisphenols of the general formula (I) are bisphenols which belong to the following groups:

dihydroxydiphenyls, bis(hydroxyphenyl)alkanes, bis(hydroxyphenyl)cycloalkanes, indan bisphenols, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides and α,α'-bis(hydroxyphenyl)diisopropylbenzenes.

Derivatives of the stated bisphenols, which may for example be obtained by alkylating or halogenating the aromatic rings of the stated bisphenols, are also examples of bisphenols according to the general formula (I).

Examples of bisphenols according to the general formula (I) are in particular the following compounds:

hydroquinone, resorcinol, 4,4'-dihydroxydiphenyl, bis(4-hydroxyphenyl) sulfide, bis(4-hydroxyphenyl) sulfone, bis(3,5-dimethyl-4-hydroxyphenyl)methane, bis(3,5-dimethyl-4-hydroxyphenyl) sulfone, 1,1-bis(3,5-dimethyl-4-hydroxyphenyl)-p/m-diisopropylbenzene, 1,1-bis(4-hydroxyphenyl)-1-phenylethane, 1,1-bis(3,5-dimethyl-4-hydroxyphenyl)cyclohexane, 1,1-bis(4-hydroxyphenyl)-3-methylcyclohexane, 1,1-bis(4-hydroxyphenyl)-3,3-dimethylcyclohexane, 1,1-bis(4-hydroxyphenyl)-4-methylcyclohexane, 1,1-bis(4-hydroxyphenyl)cyclohexane, 1,1-bis(4-hydroxyphenyl)-3,3,5-trimethylcyclohexane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)propane (i.e. bisphenol A), 2,2-bis(3-chloro-4-hydroxyphenyl)propane, 2,2-bis(3,5-dibromo-4-hydroxyphenyl)propane, 2,4-bis(4-hydroxyphenyl)-2-methylbutane, 2,4-bis(3,5-dimethyl-4-hydroxyphenyl)-2-methylbutane, α,α'-bis(4-hydroxyphenyl)-o-diisopropylbenzene, α,α'-bis(4-hydroxyphenyl)-m-diisopropylbenzene (i.e. bisphenol M), α,α'-bis(4-hydroxyphenyl)-p-diisopropylbenzene and indan bisphenol.

Particularly preferred branched polycarbonates are the branched homopolycarbonate based on bisphenol A, the branched homopolycarbonate based on 1,1-bis(4-hydroxyphenyl)-3,3,5-trimethylcyclohexane and the branched copolycarbonates based on the two monomers bisphenol A and 1,1-bis(4-hydroxyphenyl)-3,3,5-trimethylcyclohexane.

The branched homopolycarbonate based on bisphenol A is very particularly preferred.

The described bisphenols according to the general formula (I) may be produced using known processes, for example from the corresponding phenols and ketones.

The stated bisphenols and processes for the production thereof are described, for example, in the monograph by H. Schnell, "Chemistry and Physics of Polycarbonates", *Polymer Reviews*, volume 9, pages 77–98, Interscience Publishers, New York, London, Sydney, 1964 and in U.S. Pat. No. 3,028,635, in U.S. Pat. No. 3,062,781, in U.S. Pat. No. 2,999,835, in U.S. Pat. No. 3,148,172, in U.S. Pat. No. 2,991,273, in U.S. Pat. No. 3,271,367, in U.S. Pat. No. 4,982,014, in U.S. Pat. No. 2,999,846, in DE-A 1 570 703, in DE-A 2 063 050, in DE-A 2 036 052, in DE-A 2 211 956, in DE-A 3 832 396 and in FR-A 1 561 518 and in Japanese published patent applications with the application numbers 62039/1986, 62040/1986 and 105550/1986.

1,1-Bis(4-hydroxyphenyl)-3,3,5-trimethylcyclohexane and the production thereof is described, for example, in U.S. Pat. No. 4,982,014.

Indan bisphenols and the production thereof are described, for example, in U.S. Pat. No. 3,288,864, in JP-A 60 035 150 and in U.S. Pat. No. 4,334,106. Indan bisphenols may, for example, be produced from isopropenylphenol or the derivatives thereof or from dimers of isopropenylphenol or the derivatives thereof in the presence of a Friedel-Crafts catalyst in organic solvents.

The branched polycarbonates to be used according to the invention are produced in known manner from bisphenols, carbonic acid derivatives, branching agents, alkylphenols and/or arylphenols, optionally together with further substances which may act as chain terminators.

Suitable processes for the production of polycarbonates are, for example, production from bisphenols with phosgene using the phase interface process or from bisphenols with phosgene using the homogeneous phase process, the so-called pyridine process, or from bisphenols with carbonic acid esters using the melt transesterification process. These production processes are described, for example, in H. Schnell, "Chemistry and Physics of Polycarbonates", *Polymer Reviews*, volume 9, pages 31–76, Interscience Publishers, New York, London, Sydney, 1964. The stated production processes are also described in D. Freitag, U. Grigo, P. R. Müller, H. Nouvertne, "Polycarbonates" in *Encyclopedia of Polymer Science and Engineering*, volume 11, second edition, 1988, pages 648 to 718 and in U. Grigo, K. Kircher and P. R. Müller "Polycarbonate" in Becker, Braun, Kunststoff-Handbuch, volume 3/1, *Polycarbonate, Polyacetale, Polyester, Celluloseester*, Carl Hanser Verlag, Munich, Vienna 1992, pages 117 to 299 and in D. C. Prevorsek, B. T. Debona and Y. Kesten, Corporate Research Center, Allied Chemical Corporation, Morristown, N.J. 07960, "Synthesis of poly(estercarbonate) copolymers" in *Journal of Polymer Science, Polymer Chemistry Edition*, volume 19, 75–90 (1980).

The melt transesterification process is in particular described in H. Schnell, "Chemistry and Physics of Polycarbonates", *Polymer Reviews*, volume 9, pages 44 to 51, Interscience Publishers, New York, London, Sydney, 1964 and in DE-A 1 031 512, in U.S. Pat. No. 3,022,272, in U.S. Pat. No. 5,340,905 and in U.S. Pat. No. 5,399,659.

The branched polycarbonates to be used according to the invention are preferably produced using the phase interface process or the known melt transesterification process. In the first case, the carbonic acid derivative is preferably phosgene, in the second case preferably diphenyl carbonate.

The polycarbonate is preferably produced using raw materials and auxiliaries which have a low content of contaminants. In particular when production is performed using the melt transesterification process, the introduced bisphenols and the introduced carbonic acid derivatives should have the lowest possible content of alkali metal ions and alkaline earth metal ions. Raw materials of such purity are, for example, obtained by recrystallising, washing or distilling the carbonic acid derivatives, for example carbonic acid esters, and the bisphenols.

When producing polycarbonates by the melt transesterification process, the bisphenol and the carbonic acid diester may be reacted continuously or discontinuously, for example in stirred-tank reactors, thin film evaporators, falling film evaporators, stirred-tank reactors connected in series, extruders, kneaders, simple disk reactors and high viscosity disk reactors.

Carbonic acid diesters which may be used for the production of polycarbonates are, for example, diaryl esters of carbonic acid, wherein both of the aryl residues preferably each have 6 to 14 C atoms. Carbonic acid diesters based on phenol or alkyl-substituted phenols, i.e. for example diphenyl carbonate or dicresyl carbonate, are preferably used. Relative to 1 mol of bisphenol, the carbonic acid diesters are preferably used in a quantity of 1.01 to 1.30 mol, particularly preferably in a quantity of 1.02 to 1.15 mol.

The branched polycarbonates according to the invention have a weight average molar mass Mw of preferably 12000 to 120000 g/mol, particularly preferably of 26000 to 50000 g/mol and in particular of 31000 to 40000 g/mol (determined by measuring relative viscosity at 25° C. in methylene chloride at a concentration of 0.5 g per 100 ml of methylene chloride and with calibration of the viscosity measurement by ultracentrifugation or measurement of light scattering).

The phenols, alkylphenols and/or arylphenols used in the production of the branched polycarbonates according to the invention act as chain terminators, i.e. they limit the maximum achievable average molar mass. They are added either together with the monomers, which are required for the production of the polycarbonate, or during a subsequent phase of polycarbonate synthesis. They act as monofunctional compounds for the purposes of polycarbonate synthesis and thus act as chain terminators.

The phenol, alkylphenols and/or arylphenols used for the production of the branched polycarbonates are preferably used in a quantity of 0.25 to 10 mol %, relative to the total of bisphenols used in each case.

Mixtures of phenol and/or one or more alkylphenols and/or arylphenols may also be used.

The alkylphenols and/or arylphenols used in the production of the branched polycarbonate give rise to alkylphenyl end groups and arylphenyl end groups respectively. Depending upon the production process, other end groups may also occur in the resultant polycarbonate, such as for example phenolic OH end groups or chlorocarbonic acid ester end groups.

Preferably, solely phenol, alkylphenols and/or arylphenols are used, without the addition of further substances which may act as chain terminators.

Particular preferably, solely alkylphenols and/or arylphenols are used, without the addition of further substances which may act as chain terminators.

One preferred alkylphenol is, for example, para-tert.-butylphenol (c.f. Huston, *Am. Soc.* 58, 439; U.S. Pat. No. 2,051,300). Para-tert.-butylphenol is a commercial product and may, for example, be obtained from Hüls AG, Marl, Germany or PPG Industries, USA. Another preferred alkylphenol is para-cumylphenol (c.f. Welsch, *Am. Soc.* 60, 58 (1983)). Another preferred alkylphenol is isooctylphenol (c.f. U.S. Pat. No. 2,415,069). Isooctylphenol is a commercial product and may, for example, be obtained from Hüls AG, Marl, Germany. These alkylphenols and the production thereof are known to the average person skilled in the art. A review of the use and the production thereof is described in Houben-Weyl, *Methoden der organischen Chemie*, G. Thieme Verlag, $4^{th}$ edition (1976), volume 6/1c, pages 951 et seq.

When producing the branched polycarbonates according to the invention, further substances which may act as chain terminators may be used in addition to the alkylphenols and/or arylphenols.

Substances suitable for this purpose which may act as chain terminators are both monophenols and monocarboxylic acids. Suitable monophenols are, for example, phenol, p-chlorophenol or 2,4,6-tribromophenol. Suitable monocarboxylic acids are benzoic acid, alkylbenzoic acids and halobenzoic acids.

The preferred further substance which may act as chain terminator is phenol.

The quantity of further substances which may act as chain terminators is preferably between 0.25 and 10 mol %, relative to the total of the bisphenols used in each case.

The branched polycarbonates suitable according to the invention are branched in known manner, specifically preferably by incorporation of trifunctional or greater than trifunctional branching agents. Suitable branching agents are, for example, those having three or more than three phenolic groups or those having three or more than three carboxylic acid groups.

Suitable branching agents are, for example, phloroglucinol, 4,6-dimethyl-2,4,6-tri-(4-hydroxyphenyl)-2-heptene, 4,6-dimethyl-2,4,6-tri-(4-hydroxyphenyl) heptane, 1,3,5-tri-(4-hydroxyphenyl)benzene, 1,1,1-tris(4-hydroxyphenyl)ethane, tri-(4-hydroxyphenyl) phenylmethane, 2,2-bis[4,4-bis(4-hydroxyphenyl) cyclohexyl]propane, 2,4-bis(4-hydroxyphenylisopropyl) phenol, 2,6-bis(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)phenyl)terephthalic acid ester, tetra-(4-hydroxyphenyl)methane, tetra-(4-(4-hydroxyphenylisopropyl)phenoxy)methane and 1,4-bis(4', 4"-dihydroxytriphenyl)methylbenzene as well as 2,4-dihydroxybenzoic acid, trimesic acid, cyanuric chloride, 3,3-bis(3-methyl-4-hydroxyphenyl)-2-oxo-2,3-dihydroindole, trimesic acid trichloride and α,α',α"-tris(4-hydroxyphenol)-1,3,5-triisopropylbenzene.

Preferred branching agents are 1,1,1-tris(4-hydroxyphenyl)ethane (THPE) and 3,3-bis(3-methyl-4-hydroxyphenyl)-2-oxo-2,3-dihydroindole (IBK, isatin biscresol).

The quantity of the optionally used branching agents is preferably 0.05 mol % to 2 mol %, more preferably 0.1 mol % to 0.8 mol % and very particularly preferably 0.25 mol % to 0.6 mol %, relative to the moles of bisphenols used.

The branching agents may, for example when producing the polycarbonate by the phase interface process, be initially introduced into the aqueous alkaline phase together with the bisphenols and the chain terminators or be added as a solution in an organic solvent together with the carbonic acid derivatives. In the case of the transesterification process, the branching agents are preferably apportioned together with the dihydroxyaromatics or bisphenols.

The properties of the branched polycarbonates according to the invention may be modified by incorporating conventional additives and/or by applying them onto the surface. Conventional additives are, for example: fillers (for example mineral fillers), reinforcing agents (for example glass fibres), stabilisers (for example UV stabilisers, heat stabilisers, gamma radiation stabilisers), antistatic agents, flow auxiliaries, mould release agents, flame retardants, dyes and pigments, providing that they do not impair the good mechanical properties of the moulding compositions. The stated and further suitable additives are described, for example, in Gächter, Müller, Kunststoff-Additive, $3^{rd}$ edition, Hanser Verlag, Munich, Vienna, 1989.

Other polymers may be mixed with the branched polycarbonates according to the invention, resulting in so-called polymer blends, providing that the essential properties, in particular the elevated breaking strength of the containers produced from the polycarbonates, are not impaired. Blends may, for example, be produced from the polycarbonates according to the invention and ABS polymers or from the polycarbonates according to the invention and polyesters, such as for example polyethylene terephthalate or polybutylene terephthalate.

Containers for the purposes of the present invention may be used for the packaging, storage or transport of liquids, solids or gases. Containers for the packaging, storage or transport of liquids (liquid containers) are preferred, with containers for the packaging, storage or transport of water (water bottles) being particularly preferred.

Containers for the purposes of the invention are hollow articles having a volume of preferably 0.1 L to 50 L, more preferably from 0.5 L to 50 L, with volumes of 1 L, 5 L, 12 L and 20 L being very particularly preferred.

Water bottles having a volume of 3 to 5 gallons are very particularly preferred.

The containers have an empty weight of preferably 0.1 g to 3000 g, more preferably of 50 g to 2000 g and particularly preferably of 650 g to 900 g.

The wall thicknesses of the containers are preferably 0.5 mm to 5 mm, more preferably 0.8 mm to 4 mm.

Containers for the purposes of the present invention have a length of preferably 5 mm to 2000 mm, particularly preferably from 100 mm to 1000 mm.

The containers have a maximum circumference of preferably 10 mm to 250 mm, more preferably from 50 mm to 150 mm and very particularly preferably from 70 to 90 mm.

Containers for the purposes of the invention preferably have a bottle neck of a length of preferably 1 mm to 500 mm, more preferably of 10 mm to 250 mm, particularly preferably of 50 mm to 100 mm and very particularly preferably of 70 to 80 mm.

The wall thickness of the bottle neck of the container preferably ranges between 0.5 mm and 10 mm, particularly preferably from 1 mm to 10 mm and very particularly preferably from 5 mm to 7 mm.

The diameter of the bottle neck ranges between preferably 5 mm and 200 mm; 10 mm to 100 mm are particularly preferred and 45 mm to 75 mm are very particularly preferred.

The bottom of the containers according to the invention has a diameter of preferably 10 mm to 250 mm, more preferably of 50 mm to 150 mm and very particularly preferably of 70 to 90 mm.

Containers for the purposes of the present invention may have any desired geometric shape, they may for example be round, oval or polygonal or multi-sided having for example 3 to 12 sides. Round, oval and hexagonal shapes are preferred.

The design of the containers may be based on any desired surface textures. The surface textures are preferably smooth or ridged. The containers according to the invention may also exhibit two or more different surface textures. Ribs or beads may run around the circumference of the containers. They may be spaced at will or have any two or more differing spacings. The surface textures of the containers according to the invention may comprise roughened or integrated textures, symbols, ornaments, coats of arms, brands, trademarks, monograms, manufacturer's details, material designations or volume details.

The containers according to the invention may have any desired number of handles, which may be located on the sides, top or bottom of the container. The handles may be external or incorporated into the outline of the container. The handles may be collapsible or fixed. The handles may have any desired outline, for example oval, round or polygonal. The handles preferably have a length of 0.1 mm to 180 mm, preferably 20 mm to 120 mm.

Apart from the polycarbonate according to the invention, the containers according to the invention may additionally contain small quantities of other substances, for example seals of rubber or handles of other materials.

The containers according to the invention are preferably produced using the extrusion blow moulding process or using the injection blow moulding process.

In a preferred embodiment of the process for the production of the containers according to the invention, the polycarbonates according to the invention are processed in extruders having a smooth or grooved feed zone, preferably a smooth feed zone.

The drive power of the extruder is selected in accordance with the screw diameter. By way of example, at a screw diameter of 60 mm, the drive power of the extruder is approx. 30 to 40 kW, while at a screw diameter of 90 mm it is approx. 60 to 70 kW.

Multipurpose, three section screws as are conventional for processing industrial thermoplastics are suitable.

A screw diameter of 50 to 60 mm is preferred for the production of containers of a volume of 1 L. A screw diameter of 70 to 100 mm is preferred for the production of containers of a volume of 20 L. The length of the screws is preferably 20 to 25 times the diameter of the screw.

In the case of the blow moulding process, the blowing mould is preferably adjusted to a temperature of 50 to 90° C. in order to obtain a glossy, high quality surface on the container.

In order to ensure uniform and effective temperature control of the blowing mould, the temperatures of the base area and the jacket area are separately controllable.

The blowing mould is preferably closed with a pinch force of 1000 to 1500 N per cm of pinch seam length.

The polycarbonate according to the invention is preferably dried before processing to ensure that the optical quality of the containers is not impaired by streaks or bubbles and the polycarbonate is not hydrolysed during processing. The residual moisture content after drying is preferably less than 0.01 wt. %. A drying temperature of 120° C. is preferred. Lower temperatures do not ensure adequate drying, while at higher temperatures there is a risk of the individual polycarbonate pellets sticking together, thus rendering them unprocessable. Dry air dryers are preferred.

The preferred melt temperature during processing of the polycarbonate according to the invention is 230 to 300° C.

The containers according to the invention may be used for the packaging, storage or transport of liquids, solids or gases. The embodiment as containers which are used for example for the packaging, storage or transport of liquids is preferred. The embodiment as a water bottle, which may for example be used for the packaging, storage or transport of water, is particularly preferred.

A preferred embodiment of the invention is that in which the container of branched polycarbonate is characterised in that the branched polycarbonate contains THPE and/or IBK as branching agent and in which alkylphenols are used in the production of the branched polycarbonate and in which the container is a water bottle.

A particularly preferred embodiment of the invention is that in which the container of branched polycarbonate is characterised in that the branched polycarbonate contains THPE and/or IBK as branching agent and in which phenol is used in the production of the branched polycarbonate and in which, at 260° C. and a shear rate of 10 s$^{-1}$, the polycarbonate has a melt viscosity of 5500 to 7000 Pas, and, at 260° C. and a shear rate of 1000 s$^{-1}$, a melt viscosity of 900 to 1100 Pas and has an MFR (melt flow index, measured to ISO1133) of <3.5 g/10 min and in which the container is a water bottle.

A particularly preferred embodiment of the invention is furthermore that in which the container of branched polycarbonate is characterised in that the branched polycarbonate contains 1,1,1-tris(4-hydroxyphenyl)ethane (THPE) and/or 3,3-bis(3-methyl-4-hydroxyphenyl)-2-oxo-2,3-dihydroindole (IBK, isatin biscresol) as branching agent and in which para-tert.-butylphenol and/or para-cumylphenol and/or para-isooctylphenol are used in the production of the branched polycarbonate and in which the container is a water bottle.

One particularly preferred embodiment within the latter stated embodiment is that in which the branched polycarbonate contains solely 1,1,1-tris(4-hydroxyphenyl)ethane (THPE) and/or 3,3-bis(3-methyl-4-hydroxyphenyl)-2-oxo-2,3-dihydroindole (IBK, isatin biscresol) as branching agent and in which para-tert.-butylphenol and/or para-cumylphenol and/or para-isooctylphenol are used in the production of the branched polycarbonate.

One particularly preferred embodiment within the latter stated embodiment is that in which the branched polycarbonate contains solely 1,1,1-tris(4-hydroxyphenyl)ethane (THPE) and/or 3,3-bis(3-methyl-4-hydroxyphenyl)-2-oxo-2,3-dihydroindole (IBK, isatin biscresol) as branching agent and in which para-isooctylphenol is used in the production of the branched polycarbonate.

Breaking strength of the containers is preferably evaluated using the drop test, which is described below.

Preparation for the actual measurement proceeds such that the shape and mass of the container are determined before the measurement. The test only compares containers of identical shape and identical mass. The mass of containers compared in the drop test may only differ by a maximum of 5%.

The container is filled with distilled water at room temperature and then placed on a trapdoor platform, the floor of which takes the form of a trapdoor. For the first measurement, the trapdoor platform is raised until its floor is 0.5 m above the floor beneath, which consists of a thick steel plate. The trapdoor is then opened such that the water-filled container falls on the floor. If the container is not broken, the same container is put back on the trapdoor platform and raised to a height of 1 m for a second measurement by the container being dropped again in the described manner. Further measurements are made, with the drop height being raised by 0.5 m in each case. In this manner, a failure drop height is determined, which is defined as the height at which the hollow article breaks and the water runs out. An average failure drop height, a mean from ten drop tests, is used as a measure of the mechanical strength of the containers.

The container according to the invention is illustrated in greater detail below by means of a drawing (FIG. 1) which merely represents a preferred example.

FIG. 1 is a cross-section through a rotationally symmetrical container (a water bottle). The container has a weight of 780 g±15 g, a height of approx. 485 mm and a neck diameter of approx. 54.8 mm, circumference approx. 855 mm. It consists of branched polycarbonate. The container holds a volume of 18.9 L (5 gallons).

The following examples illustrate the invention in greater detail.

A container according to the invention according to FIG. 1 was produced by the extrusion blow moulding process using a blow moulding machine from Krupp-Kautex Maschinenbau GmbH, Bonn, Germany (extruder: screw diameter: 90 mm, effective screw length: 22D, head: 3.5 L Fifo, closing force: 300 kN, cycle time: 31 s to 32 s, ejection time: 5.3 s to 5.6 s) at a melt temperature of 260° C. and a blowing mould temperature of approx. 90° C. from branched bisphenol A polycarbonates (Examples 1 to 7, Table 1 and Comparative Examples 1 to 5, Table 2). These bisphenol A polycarbonates were produced using the phase interface process. The chain terminators and branching agents used are shown in Tables 1 and 2. The branching agent content was 0.30 mol % in all the Examples and Comparative Examples. The same tables state the associated MFR values, melt viscosity at shear rates of 10 s$^{-1}$ and 1000 s$^{-1}$ at a temperature of 260° C. and the SV index (=branching index).

The containers according to the invention were subjected to the drop test described in the present text.

Ten tests were performed per container and an average failure drop height, corresponding to a mean value from the ten values, was calculated from the ten measurements.

The container used in the tests was of the form shown in FIG. 1.

TABLE 1

| Example | Chain terminator | Branching agent | MFR | Shear rates at 260° C. 10 s$^{-1}$ | 1000 s$^{-1}$ | SV index |
|---|---|---|---|---|---|---|
| 1 | phenol | IBK | 2.5 | 6653 | 953 | 7.0 |
| 2 | phenol | THPE | 2.7 | 6414 | 954 | 6.7 |
| 3 | p-tert.-butylphenol | IBK | 2.8 | 6616 | 976 | 6.6 |
| 4 | p-tert.-butylphenol | THPE | 2.7 | 6390 | 996 | 6.4 |
| 5 | p-cumyl-phenol | IBK | 2.0 | 7212 | 980 | 7.4 |
| 6 | p-cumyl-phenol | THPE | 2.3 | 6862 | 1041 | 6.6 |
| 7 | isooctyl-phenol | IBK | 2.2 | 6905 | 968 | 7.1 |

TABLE 2

| Comparative Example | Chain terminator | Branching agent | MFR | Shear rates at 260° C. 10 s$^{-1}$ | 1000 s$^{-1}$ | SV index |
|---|---|---|---|---|---|---|
| 1 | phenol | IBK | 3.2 | 5220 | 870 | 6.0 |
| 2 | phenol | THPE | 3.5 | 4912 | 847 | 5.8 |
| 3 | p-tert.-butylphenol | IBK | 3.7 | 4876 | 855 | 5.7 |
| 4 | p-tert.-butylphenol | THPE | 3.4 | 4998 | 841 | 5.9 |
| 5 | p-cumyl-phenol | THPE | 3.7 | 4896 | 874 | 5.6 |

TABLE 3

| Example | Average failure drop height in m |
|---|---|
| 1 | 2.8 |
| 2 | 2.9 |
| 3 | 3.2 |
| 4 | 3.3 |
| 5 | 3.8 |
| 6 | 3.6 |
| 7 | 3.6 |

TABLE 4

| Comparative Example | Average failure drop height in m |
|---|---|
| 1 | 1.5 |
| 2 | 1.7 |
| 3 | 2.1 |
| 4 | 2.3 |
| 5 | 2.2 |

The examples demonstrate the superior breaking strength of the containers according to the invention.

What is claimed is:

1. A container comprising a branched polycarbonate wherein
   (i) at 260° C. and a shear rate of 10 s$^{-1}$, the branched polycarbonate has a melt viscosity of 5500 to 9000 Pas,
   (ii) at 260° C. and a shear rate of 1000 s$^{-1}$, the branched polycarbonate has a melt viscosity of 880 to 1500 Pas, and
   (iii) the branched polycarbonate has an MFR (melt flow index) of 0.1 to 3.0 g/10 min.

2. The container of claim 1, wherein said branched polycarbonate is prepared from at least one of phenol, alkylphenols and arylphenols.

3. The container of claim 1, wherein the branched polycarbonate is prepared from phenol, and the branched polycarbonate contains at least one residue of a branching agent selected from the group consisting of 1,1,1-tris(4-hydroxyphenyl)ethane (THPE) and 3,3-bis(3-methyl-4-hydroxyphenyl)-2-oxo-2,3-dihydroindole (IBK, isatin biscresol).

4. The container of claim 1, wherein the branched polycarbonate is prepared from at least one of alkylphenols and arylphenols, and the branched polycarbonate contains at least one residue of a branching agent selected from the group consisting of 1,1,1-tris(4-hydroxyphenyl)ethane (THPE) and/or 3,3-bis(3-methyl-4-hydroxyphenyl)-2-oxo-2,3-dihydroindole (IBK, isatin biscresol).

5. The container of claim 4, wherein the arylphenol is p-tert-cumylphenol.

6. The container of claim 4, wherein the alkylphenol is one of p-tert-butylphenol and isooctylphenol.

7. The container of claim 1, wherein the branched polycarbonate is a branched homopoly-carbonate based on bisphenol A.

8. The container of claim 1, wherein the container is a liquid container.

9. The container of claim 1, wherein the container is a water bottle.

10. A method of producing the containers of claim 1 comprising injection blow molding a molding composition comprising the branched polycarbonate.

11. A method of producing the containers of claim 1 comprising extrusion blow molding a molding composition comprising the branched polycarbonate.

12. A branched polycarbonate, having:
   (i) at 260° C. and a shear rate of 10 s$^{-1}$, a melt viscosity of 5500 to 9000 Pas;
   (ii) at 260° C. and a shear rate of 1000 s$^{-1}$, a melt viscosity of 880 to 1500 Pas; and
   (iii) an MFR (melt flow index) of 0.1 to 3.0 g/10 min.

13. The branched polycarbonate of claim 12, wherein said branched polycarbonate is prepared from at least one of phenol, alkylphenols and arylphenols.

14. The branched polycarbonate of claim 12, wherein said branched polycarbonate is prepared from phenol, and the branched polycarbonate contains at least one residue of a branching agent selected from the group consisting of 1,1,1-tris(4-hydroxyphenyl)ethane (THPE) and 3,3-bis(3-methyl-4-hydroxyphenyl)-2-oxo-2,3-dihydroindole (IBK, isatin biscresol).

15. The branched polycarbonate of claim 12, wherein the branched polycarbonate is prepared from at least one of alkylphenols and arylphenols, and the branched polycarbonate contains at least one residue of a branching agent selected from the group consisting of 1,1,1-tris(4-hydroxyphenyl)ethane (THPE) and 3,3-bis(3-methyl-4-hydroxyphenyl)-2-oxo-2,3-dihydroindole (IBK, isatin biscresol).

* * * * *